US012051552B2

(12) United States Patent
Gorai et al.

(10) Patent No.: US 12,051,552 B2
(45) Date of Patent: Jul. 30, 2024

(54) SWITCHING DEVICE

(71) Applicants: ALPS ALPINE CO., LTD., Tokyo (JP); OLYMPUS CORPORATION, Tokyo (JP)

(72) Inventors: Shigeto Gorai, Miyagi (JP); Tetsu Numata, Miyagi (JP); Akihiro Kusaka, Miyagi (JP); Shunsuke Kimura, Fukushima (JP); Reiji Koyama, Tokyo (JP)

(73) Assignees: ALPS ALPINE CO., LTD., Tokyo (JP); OLYMPUS CORPORATION, Tokyo (JP)

( * ) Notice: Subject to any disclaimer, the term of this patent is extended or adjusted under 35 U.S.C. 154(b) by 139 days.

(21) Appl. No.: 17/659,882

(22) Filed: Apr. 20, 2022

(65) Prior Publication Data

US 2022/0246374 A1 Aug. 4, 2022

Related U.S. Application Data

(63) Continuation of application No. PCT/JP2020/039772, filed on Oct. 22, 2020.

(30) Foreign Application Priority Data

Oct. 29, 2019 (JP) ................................. 2019-195904

(51) Int. Cl.
*H01H 25/06* (2006.01)
*H01H 25/04* (2006.01)

(52) U.S. Cl.
CPC ............ *H01H 25/06* (2013.01); *H01H 25/04* (2013.01)

(58) Field of Classification Search
CPC .... H01H 23/143; H01H 23/30; H01H 23/025; H01H 2300/03; H01H 23/145;
(Continued)

(56) References Cited

U.S. PATENT DOCUMENTS 2,749,400 A * 6/1956 Chichester ........... H01H 23/162 200/453
3,641,291 A * 2/1972 Carling ................ H01H 23/168 200/437
(Continued)

FOREIGN PATENT DOCUMENTS

JP 2001-035319 2/2001
JP 2011-034796 2/2011
(Continued)

OTHER PUBLICATIONS

International Search Report for PCT/JP2020/039772 mailed on Dec. 15, 2020.

*Primary Examiner* — Ahmed M Saeed
(74) *Attorney, Agent, or Firm* — IPUSA, PLLC

(57) ABSTRACT

A switching device includes a switch unit with a contact structure and a first operation shaft. The switching device includes a second flange with a contact portion to be in contact with the first operation shaft, and includes a second operation shaft. The switching device includes a holding member with an engagement portion to be engaged with an upper surface of the second flange. The switching device includes a switch operator in which the holding member is inserted. When a lateral pressing force is applied to the switch operator, a second contact portion between the second flange and the engagement portion serves as a support, and thus the second operation shaft rotates with the support. The first operation shaft rotates in accordance with the rotation of the second operation shaft, so that the contact structure is electrically conductive.

1 Claim, 14 Drawing Sheets

(58) Field of Classification Search

CPC .. H01H 2221/016; H01H 23/14; H01H 23/04; H01H 23/168; H01H 2221/018; H01H 23/02; H01H 23/12; H01H 23/003; H01H 23/146; H01H 23/16; H01H 23/20; H01H 23/28; H01H 23/00; H01H 23/148; H01H 23/24; H01H 23/26; H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20

See application file for complete search history.

(56) References Cited

U.S. PATENT DOCUMENTS 5,889,242 A * 3/1999 Ishihara ................. G05G 9/047 200/6 A
6,344,619 B1 2/2002 Yamasaki et al.
6,979,785 B2 * 12/2005 Yamasaki ............ H01H 25/041 200/6 A

FOREIGN PATENT DOCUMENTS

JP 2014-117574 6/2014
JP 2018-134355 8/2018

* cited by examiner

SWITCHING DEVICE

CROSS-REFERENCE TO RELATED APPLICATIONS

This application is a continuation application of International Application No. PCT/JP2020/039772, filed on Oct. 22, 2020, and designated the U.S., which is based upon and claims priority to Japanese Patent Application No. 2019-195904, filed on Oct. 29, 2019, the entire contents of which are incorporated herein by reference.

BACKGROUND

1. Field of the Invention

The present disclosure relates to a switching device, particularly to a switching device that enables an switch input even when operations are performed with respect to any one of a vertical direction and a lateral direction.

2. Description of the Related Art

Switching devices have been known in which a switch input is enabled even when operations are performed with respect to any one of a vertical direction and a lateral direction. Patent Document 1 discloses a button switching device. FIG. 14 illustrates a multidirectional operation switch 900 disclosed in Patent Document 1.

As illustrated in FIG. 14, the multidirectional operation switch 900 includes a central fixed contact 933 and an outer fixed contact 934, at the bottom surface of the switch. Peripheral fixed contacts 935 to 938 are disposed in a resin case 931 of which an upper side includes a rectangular opening. The case 931 is provided in a state in which a circularly dome-shaped movable contact 945 is in contact with the outer fixed contact 934. A shaft 946A of an operator 946 is pressed to perform switching in which the central fixed contact 933 comes into contact with the outer fixed contact 934, where a contact piece 947 is provided on a lower surface of a flange 946B that is over the outer fixed contact 934, and the contact piece 947 is provided on the operator 946. Further, the shaft 946A is inclined to enable switching between any two among the peripheral fixed contacts 935 to 938, while inverting the circularly dome-shaped movable contact 945.

In such a configuration, in any one of a case in which the operator is pressed and a case in which the operator is inclined, predetermined switching can be performed while obtaining a control feel provided by inverting one circularly dome-shaped movable contact.

RELATED-ART DOCUMENT

Patent Document

Patent Document 1] Japanese Unexamined Patent Application Publication No. 2001-035319

In the multidirectional operation switch 900, the operator 946 and a control knob 948 are combined to form one switch operator. Also, the operator 948 directly presses the circularly dome-shaped movable contact 945. In this case, the control knob 948 is operated in a vertical direction. However, if the control knob 948 is operated laterally, a lateral operation force applied to the control knob 948 is unlikely to be converted into a force to press the circularly dome-shaped movable contact 945, and thus it may be difficult to press the circularly dome-shaped movable contact 945.

In order to operate the circularly dome-shaped movable contact 945 in according with a reduced operation force laterally applied to the control knob 948, the operator 946 needs to be lengthened in an axial direction. However, if an axial dimension of the operator 946 is increased, a tilt angle of the operator 946 to be pressed laterally is increased, resulting in an increased lateral operational stroke.

In view of the point described above, an object of one or more embodiments in the present disclosure is to provide a switching device that allows a switch operator to be lengthened in an axial direction to thereby improve operability during a lateral press operation and to suppress an increase in a lateral operational stroke.

In the present disclosure, a switching device includes a contact structure and an operation member including at least a first operation shaft and a second operation shaft, the second operation shaft being configured to operate the contact structure and to receive an operation force. The first operation shaft is configured to tilt, upon occurrence of a condition in which the second operation shaft tilts in accordance with the operation force applied to the second operation shaft, so that the contact structure is operated.

In a switching device in the present disclosure, a first operation shaft is configured to move in an approximate axial direction, upon occurrence of a condition in which an operation force to press a second operation shaft acts in the approximate axial direction, so that a contact structure is operated.

In a switching device in the present disclosure, a first operation shaft and a second operation shaft are aligned in an axial direction to contact each other. The first operation shaft is configured to receive a force generated upon occurrence of a condition in which the second operation shaft tilts, and to tilt in response to receiving the force.

A switching device in the present disclosure, a first operation shaft includes a first flange and is configured to tilt with a support that is served by a first contact portion between a first fixed-side support and the first flange. A second operation shaft includes a second flange and is configured to tilt with a support that is served by a second contact between a second fixed-side support and the second flange.

In a switching device in the present disclosure, a first operation shaft includes a contact-pressing portion on a side of the contact structure, the contact-pressing portion being configured to press the contact structure. The first operation shaft includes a first target portion to be pressed, on a side of the second operation shaft. A second operation shaft includes a couple-pressing portion on a side of the first operation shaft, the couple-pressing portion being configured to press the first target portion. The second operation shaft includes a second target portion on a side of an operation, the second target portion being configured to receive the operation force.

In a switching device in the present disclosure, a support with which a first operation shaft tilts switches from a contact portion between a contact-pressing portion and a movable contact, to a first contact portion, in accordance with tilting of the first operation shaft.

In a switching device in the present disclosure, each of a first operation shaft and a second operation shaft is configured to tilt in a different direction.

In a switching device in the present disclosure, each of a first operation shaft and a second operation shaft is configured to tilt in a same direction.

In a switching device in the present disclosure, an axial line of a first operation shaft and an axial line of a second operation shaft are not parallel to each other in an initial state in which an operation force is yet to act.

In a switching device in the present disclosure, an operator is divided into a plurality of operation shafts. When a second operation shaft tilts in accordance with an applied lateral operation force, a corresponding force to tilt the second operation shaft is transferred to an individual operation shaft. Thus, a contact structure is operated. With this arrangement, even if a dimension of the contact structure is increased, a lateral operational stroke required to operate the contact structure can be prevented from being made excessively. Therefore, the switching device can be easily manipulated and the contact structure can be operated reliably.

DESCRIPTION OF THE EMBODIMENTS

Embodiments

A switching device according to one or more embodiments of the present disclosure will be described below with reference to the drawings. In the present disclosure, the switching device is a compact switching device that is incorporated into an operating device or the like, which is held and operated through a user's hand, for example. In particular, the switching device can be manipulated without visually checking a switch operator. The switching device is used in which a contact structure can be operated even when the switch operator is operated in any one of a vertical direction and a lateral direction. Application of the switching device of the present disclosure is not limited to the above example, and modifications can be made as appropriate. In this description, unless otherwise indicated, an X1-side is referred to as a right side, an X2-side is referred to as a left side, a Z1-side is referred to as a top side, and a Z2-side is referred to as a bottom side, in each figure.

Figure 1:
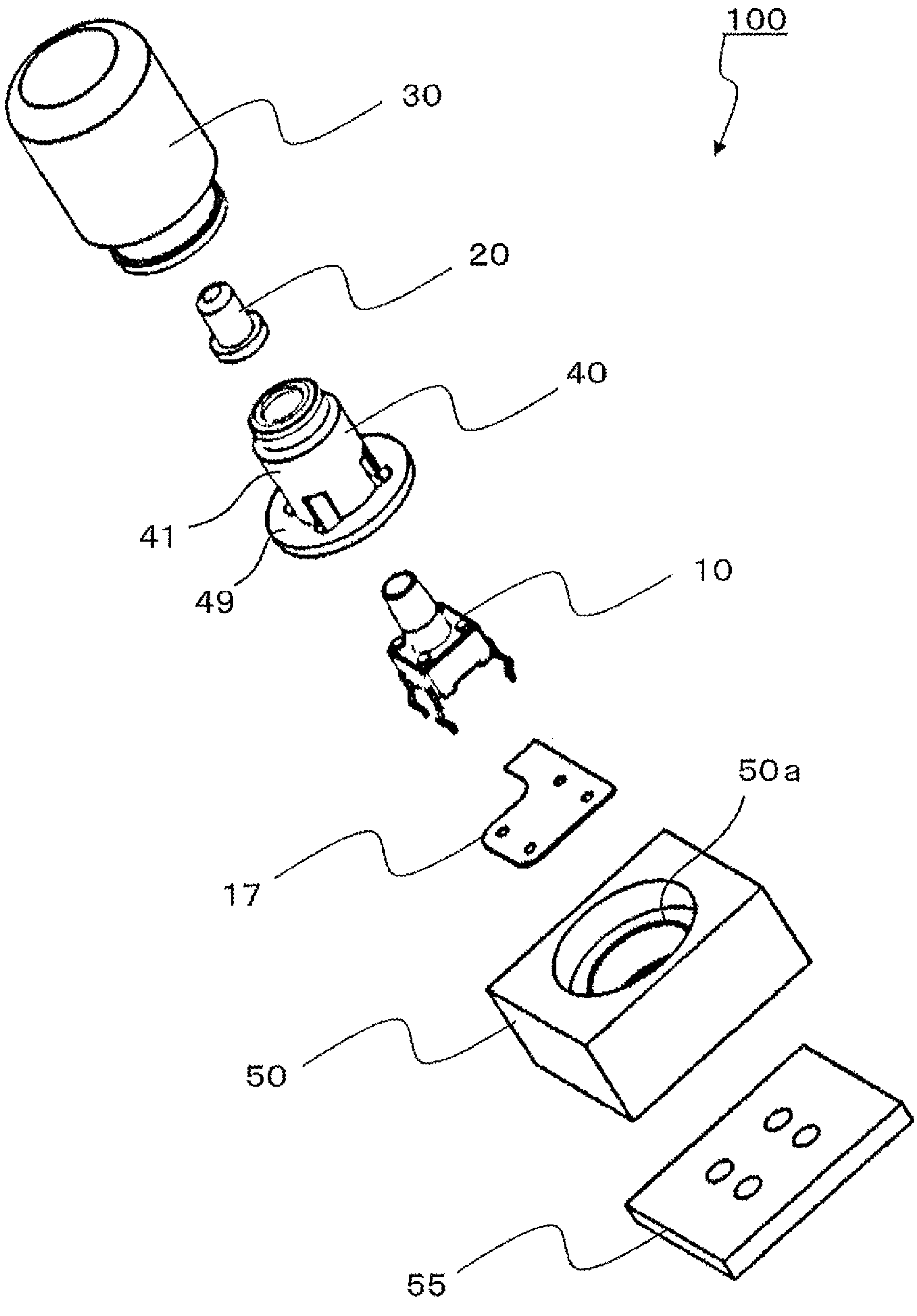
FIG. 1 is an exploded perspective view of a switching device according to one embodiment of the present disclosure.
Figure 2:
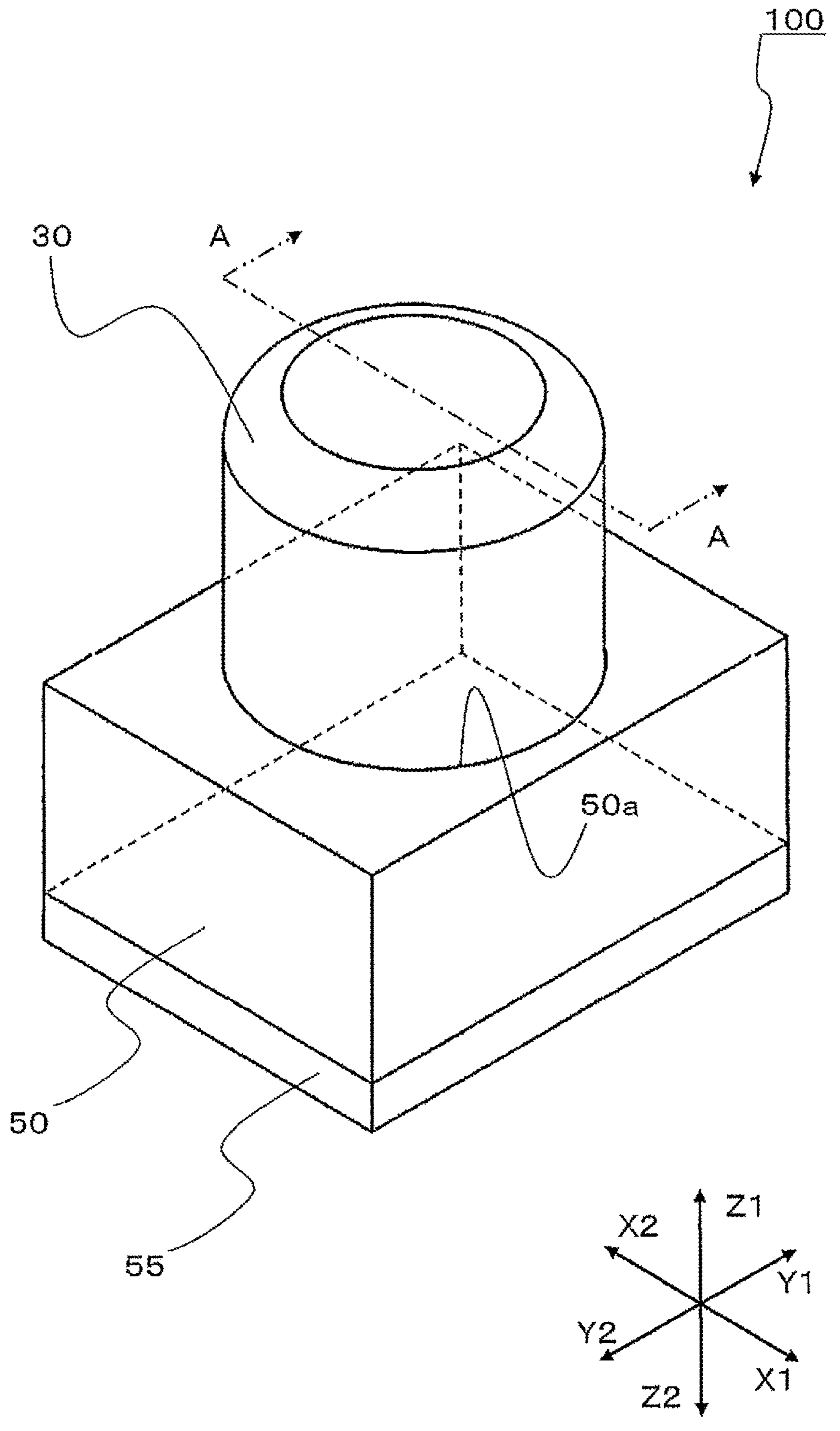
FIG. 2 is a perspective view of the switching device according to one embodiment.
Figure 3:
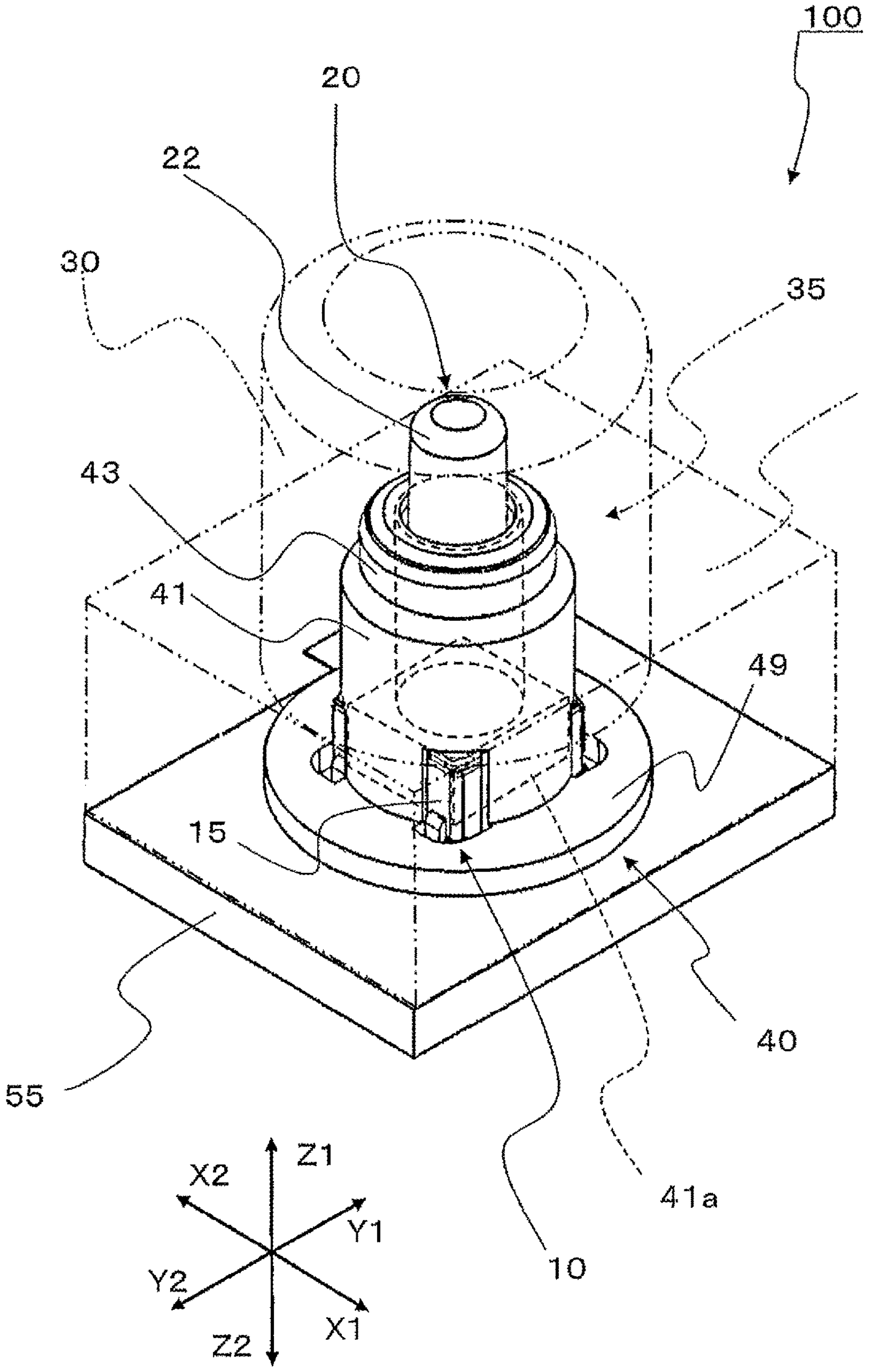
FIG. 3 is a transparent perspective view of an internal structure of the switching device according to one embodiment.
Figure 4:
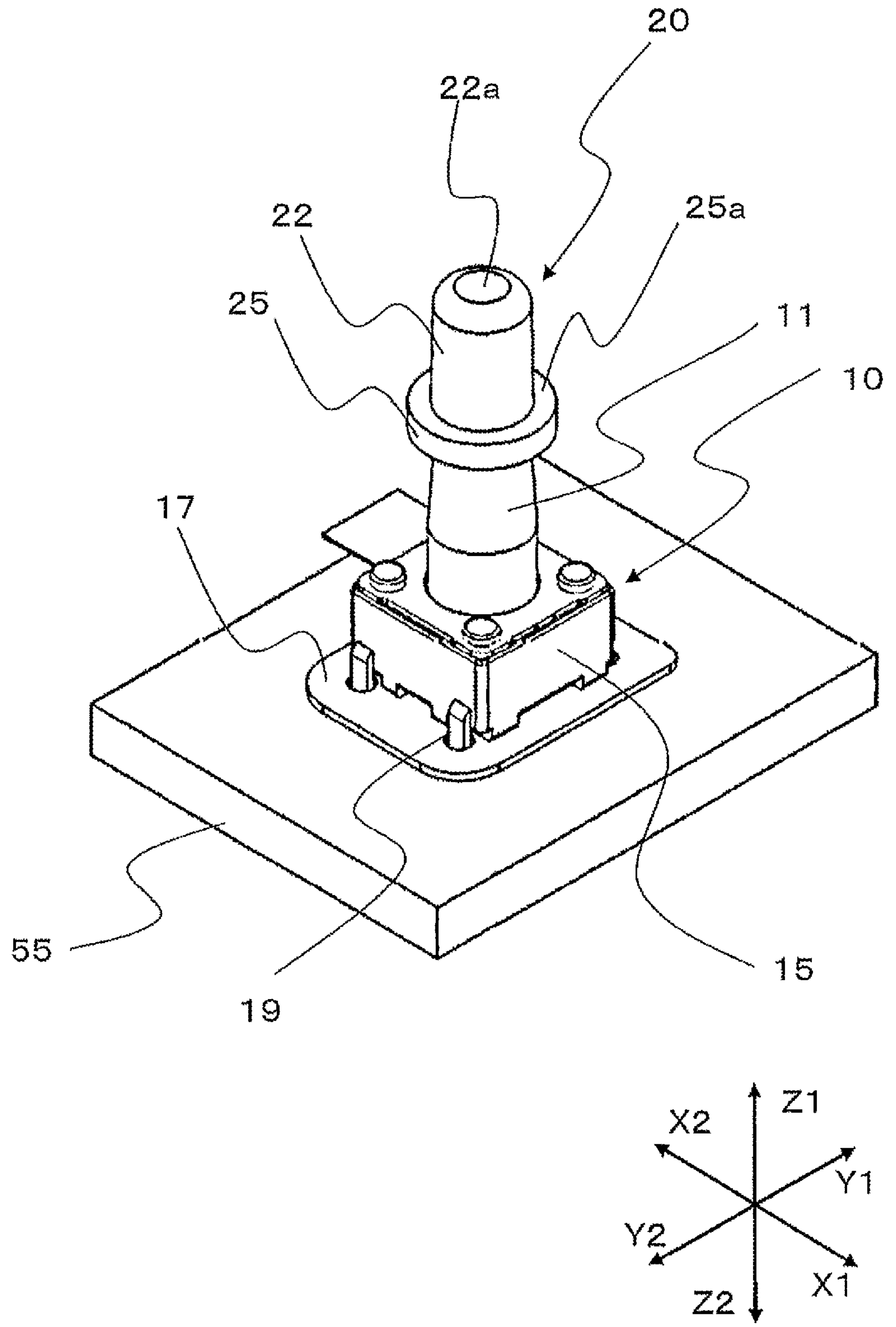
FIG. 4 is a perspective view of a switch unit and an operation member according to one embodiment.

The overall configuration of a switching device 100 will be described below with reference to FIGS. 1 to 4. FIG. 1 is an exploded perspective view of the switching device 100 according to one embodiment of the present disclosure. FIG. 2 is a perspective view of the switching device 100. FIG. 3 is a perspective view of an internal structure of the switching device 100. FIG. 4 is a perspective view of a switch unit 10 and an operation member 20.

As illustrated in FIG. 1, the switching device 100 includes a base 55, a case 50, a flexible substrate 17, a switch unit 10, a holding member 40, an operation member 20, and a switch operator 30.

In the switching device 100, as illustrated in FIG. 2, the case 50 having a large opening 50*a* in the center is secured to a base 55 having a flat upper surface, and the shape of the opening 50*a* is a circle in a plan view. The switch operator 30 is disposed within the opening 50*a* of the case 50, and the upper side of the switch operator 30 has a shape that protrudes upward from the opening 50*a*. In the switching device 100, the switch operator 30 is pressed and thus switching is performed. The switch operator 30 is operable in the vertical direction (Z-direction, i.e., in an approximately axial direction of each operation shaft). Also, the switch operator 30 is operable in the lateral direction, i.e., a given direction (tilt direction of each operation shaft) different from the vertical direction.

Each of the base 55 and the case 50 is formed to have a rectangular shape in a plan view and is formed of a durable material, such as a rigid synthetic resin material. The shape of the case 50 is not be rectangular and may be formed to have a round shape such that the case is easily gripped by a user's hand. The switch operator 30 is formed of a resilient silicon rubber or the like, in order to fit the hand. The switch operator 30 is formed to have a cylindrical shape in which an upper side of the switching operator is closed and an lower side is open. An interior of the switch operator 30 has an accommodating space 35 (see FIGS. 3 and 6) in which other components are accommodated.

Figure 6:
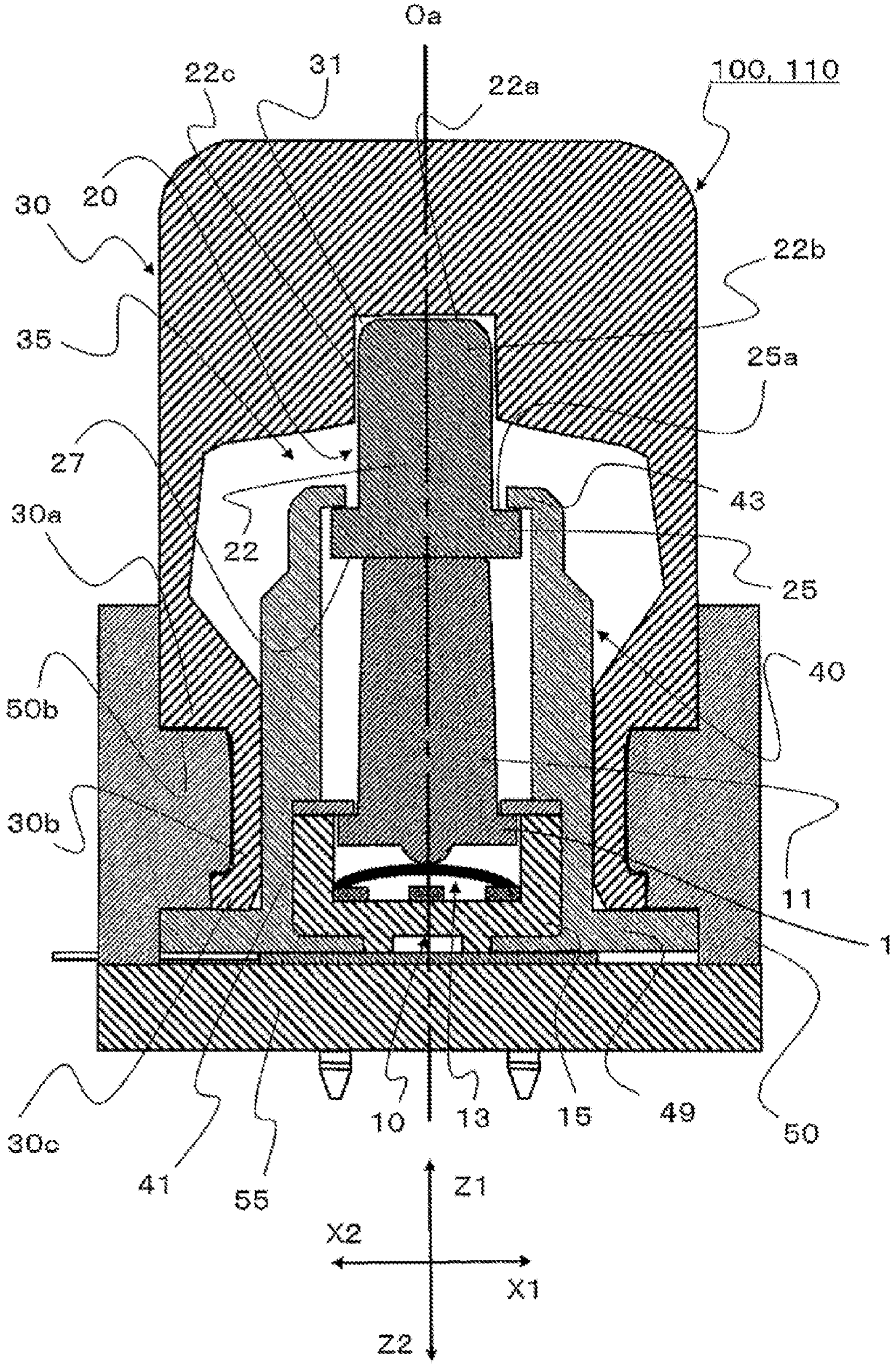
FIG. 6 is a cross-sectional view of the switching device in an initial state in which an operating force is yet to act on the switching device according to one embodiment.

As illustrated in FIGS. 3 and 6, the holding member 40 is disposed on the base 55, within the accommodating space 35 of the switch operator 30. The switch unit 10 is disposed within the holding member 40. A portion, which is to be operated, of a second operation shaft 22 that constitutes part of the operation member 20.

The holding member 40 holds the switch unit 10, which is disposed in an interior of the holding member 40, and is provided to form a second contact portion to be in contact with the second operation shaft 22. The holding member 40 is formed of a synthetic resinous material and has openings vertically. The holding member 40 is composed of a pedestal 49, a holding portion 41, and an engagement portion 43. The pedestal 49 is circular in a plan view and is mounted on the base 55. The holding portion 41 is cylindrical and is formed so as to protrude upward from the pedestal 49. The engagement portion 43 has a cylindrical shape that is formed to protrude upward from the holding portion 41 and of which the diameter is smaller than the diameter of the holding portion 41. The engagement portion 43 serves as a second fixed-side support that forms a second contact portion to be in contact with the second operation shaft 22.

In the interior of the holding portion 41 of the holding member 40, a holding space 41*a* is formed to have a cuboid shape in order to hold a switch body 15 (see FIG. 4) of the switch unit 10 that is formed to have a rectangular shape. In respective portions of the holding portion 41, corresponding to four outer corners of the switch unit 10, openings through which the four corners of the switch unit 10 are exposed are provided. Further, a cylindrical space in which the first operation shaft 11 (see FIG. 4) and the second operation shaft 22 are accommodated is formed in an upper interior of the holding portion 41 and an interior of the engagement portion 43.

As illustrated in FIG. 4, the switch unit 10 is formed to include (i) the switch body 15 that is formed to have the aforementioned cuboid shape and (ii) the first operation shaft 11 that has the cylindrical shape and protrudes upward from the switch body 15. The first operation shaft 11 constitutes part of the operation member 20. That is, the operation member 20 is composed of the first operation shaft 11 and the second operation shaft 22. In the present disclosure, the operation member 20 may be composed of the first operation shaft 11, the second operation shaft 22, and a separate operation shaft that is interposed between the operation shafts 11 and 22.

The switch unit 10 is mounted over the base 55 via a flexible substrate 17 and is attached to the base 55. In the switch body 15, each of a housing and the first operation shaft 11 is formed of a synthetic resin material. Each of four connection terminals 19, which extends downward and is formed of an electrically conductive metal, is provided with respect to the switch body 15. Each connection terminal is in electrical continuity with a land of a surface of the flexible substrate 17.

As illustrated in FIGS. 4 and 6, the first operation shaft 11 and the second operation shaft 22, which constitute the operation member 20, are aligned in an axial direction. An upper end portion of the first operation shaft 11 and a lower end portion of the second operation shaft 22 are in contact with each other. A second flange 25 is formed at the lower end portion of the second operation shaft 22, and the second flange 25 has the diameter that is greater than the diameter of a main body of the second operation shaft 22. An upper end portion 22*a* of the second operation shaft 22 has a flat surface that is formed to have a circular shape in a plan view.

Figure 5:
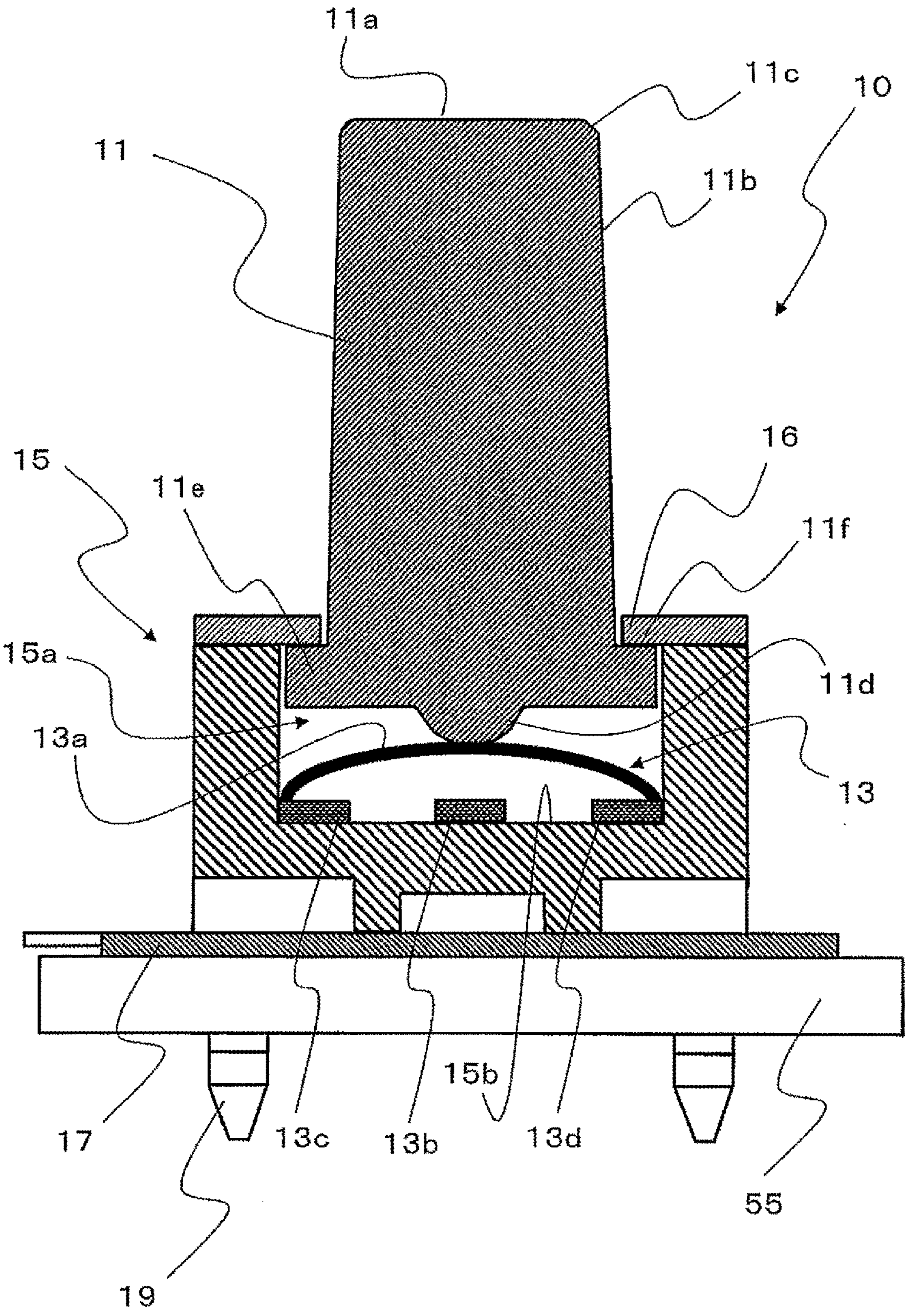
FIG. 5 is an enlarged cross-sectional view of the switch unit according to one embodiment.

Referring now to FIGS. 5 and 6, the structure of the switching device 100 will be described in detail. FIG. 5 is an enlarged cross-sectional view of the switch unit 10 taken along the A-A line in FIG. 2. FIG. 6 is a cross-sectional view of the switching device 100 taken along the A-A line in FIG. 2, and the switching device 100 is yet to be operated.

The switch unit 10 includes the switch body 15, the first operation shaft 11 that is a portion of the operation member 20, and the upper housing 16. The first operation shaft 11 protrudes upward from a hole that is formed in the upper housing 16. The upper housing 16 for the switch body 15 is a "first fixed-side support" that forms a first contact portion to be in contact with the first operation shaft 11.

In the interior of the switch body 15, as illustrated in FIG. 5, a switch mechanism space 15*a* is formed to have a circular shape in a plan view and is surrounded by a given sidewall. A flat bottom surface 15*b* is provided at an lower surface of the switch mechanism space 15*a*. Instead of the circular shape in a plan view, the switch mechanism space 15*a* may be formed to have a regular polygonal shape such as a square shape in a plan view. The upper housing 16 is attached to the upper side of the switch body 15 so as to cover the switch mechanism space 15*a*.

The contact structure 13 is provided in the switch mechanism space 15*a*. The contact structure 13 is composed of a movable contact 13*a*, a first fixed contact 13*b*, a second fixed contact 13*c*, and a second fixed contact 13*d*. As illustrated in FIG. 5, the movable contact 13*a* is formed to have an upwardly protruding dome shape and is formed of a resilient, conductive metal. The movable contact 13*a* is mounted on the bottom surface 15*b* that is in a switch formation hole 15*a*, and is supported by a wall of the switch formation hole 15*a*.

The first fixed contact 13*b*, the second fixed contact 13*c*, and the second fixed contact 13*d* are each formed of electrically conductive metal and are provided on the bottom surface 15*b* that is in the switch formation hole 15*a*. The first fixed contact 13*b* is disposed at the center of the bottom surface 15*b*. The second fixed contact 13*c* and the second fixed contact 13*d* are each disposed on the bottom surface 15*b* toward the sidewall of the switch body 15. The second fixed contact 13*c* and the second fixed contact 13*d* are electrically coupled to each other. Ends of the movable contact 13*a* described above are disposed so as to constantly contact the second fixed contact 13*c* and the second fixed contact 13*d*, respectively.

The second fixed contact 13*c*, the second fixed contact 13*d*, and the first fixed contact 13*b* are respectively coupled to connection terminals 19. Each connection terminal 19 is coupled, via a conductor layer of the flexible substrate 17, to a circuit that is provided within a main body of a given operation device that incorporates the switching device 100.

At the upper side of the switch mechanism space 15*a* of the switch body 15, the first operation shaft 11 is provided to protrude upward from the upper surface of the switch body 15. In the switch unit 10, even when any one of a vertical pressing force and a lateral pressing force is applied to the first operation shaft 11, the first operation shaft 11 moves, and thus the contact structure 13 becomes electrically conductive. Therefore, the contact structure 13 becomes in an operational state. That is, the first fixed contact 13*b*, the second fixed contact 13*c*, and the second fixed contact 13*d* simultaneously contact the movable contact 13*a*. Thus, the first fixed contact 13*b* and the second fixed contact 13*c* become conductive, and further, the first fixed contact 13*b* and the second fixed contact 13*d* become conductive. When applying of the pressing force to the first operation shaft 11 is released, the position of first operation shaft 11 returns to an initial position.

The first operation shaft 11 is formed to have a cylindrical shape, and an upper end of the first operation shaft 11 is a top surface 11*a* having a flat surface. The periphery of a top surface 11*a* extends downward to form a side surface 11*b*. An edge 11*c* is formed at an interface between the top surface 11*a* and the side surface 11*b* of the first operation shaft 11. In the first operation shaft 11, the edge 11*c* or the top surface 11*a* is a "portion to be pressed," and a pressing force is applied to the portion in accordance with the movement of the second operation shaft 22.

A first flange 11*e* is formed at the lower side of the first operation shaft 11. The first operation shaft 11 is disposed such that an upper flange surface 11*f*, which is an upper surface of a first flange 11*e*, contacts the lower surface of the upper housing 16. The first contact portion can be formed between the first flange 11*e* of the first operation shaft 11 and the lower surface of the upper housing 16.

A contact-pressing portion 11*d* is provided on the central lower surface of the first flange 11*e*. The contact-pressing portion 11*d* is formed to have a hemispherical shape that is protruded downward. A top end of the contact-pressing portion 11*d* contacts a central portion of the movable contact 13*a* that is provided in the switch formation hole 15*a*. In an initial tilt operation of the first operation shaft 11, a contact, as a contact portion, between the contact-pressing portion 11*d* and the movable contact 13*a* is used and thus a tilt operation of the first operation shaft 11 is performed. The first operation shaft 11 includes a contact-pressing portion 11*d* to press the contact structure, on a side of the contact structure. The first operation shaft 11 also includes a portion to be pressed, on a side of the second operation shaft. The second operation shaft includes a couple-pressing portion to press the portion to be pressed, on the side of the first operation shaft. The second operation shaft also includes a portion to be operated, on the side of an operation, and the portion to be operated receives an operation force.

As illustrated in FIG. 6, in the switching device 100, the second operation shaft 22 is disposed over the first operation shaft 11 of the switch unit 10 that is mounted over the base 55. A contact portion 27 that is in contact with the first operation shaft 11 is provided at the lower surface of the second flange 25 that is under the second operation shaft 22. The contact portion 27 serves as a "couple-pressing portion" that applies a force to the first operation shaft 11.

The switch body 15 of the switch unit 10 is held and accommodated in a holding portion 41 of the holding member 40. An upper surface 25*a* of the second flange 25 on the second operation shaft 22, which is disposed over the first operation shaft 11 of the switch unit 10, is engaged with the engagement portion 43 that is provided on the upper side of the holding member 40. The switch body 15 is held within the holding portion 41, and the upper surface 25*a* of the second flange 25 is engaged with the engagement portion 43. With this arrangement, in an initial state in which the press operation is yet to be performed, as illustrated in FIG. 6, the first operation shaft 11 and the second operation shaft 22, which constitute the operation member 20, are supported, in a stationary state, by the holding member 40

In the case 50, a step 50*b* is provided in order to support the switch operator 30 when the switch operator 30 is attached to the case 50. In the switch operator 30, a contact portion 30*a* that contacts the step 50*b* of the case 50 is provided. As described above, by providing the step 50*b* in the case 50 and providing the contact portion 30*a* in the switch operator 30, the switch operator 30 can be reliably supported by the case 50, even when the switch operator 30 is pressed in any direction.

A leg 30*b* of the switch operator 30 is disposed so as to surround the periphery of the holding member 40, and thus operations can be performed stably when the switch operator 30 is operated.

A recess 31, which engages an upper portion 22*b* of the second operation shaft 22 in the operation member 20, is provided in an interior of the switch operator 30, and the switch operator 30 is disposed so as to cover the second operation shaft 22. The upper portion 22*b* on the upper side of the second operation shaft 22 is a "portion to be operated," and the portion to be operated receives an operation force from the switch operator 30. An inner shape of the recess 31 is rectangular. In a state in which the switch operator 30 is yet to be pressed, in the recess 31, a ceiling portion of the recess 31 in the switch operator 30 does not contact the upper end portion 22*a* of the second operation shaft 22, and further, a wall of the cutout portion 31 does not contact the side portion of the second operation shaft 22. Thus, a small space is provided between the ceiling portion and the upper end portion 22*a*, and a small space is provided between the wall of the recess 31 and the side portion of the second operation shaft 22.

When the switch operator 30 is pressed in a state in which the upper-side portion 22*b* in the second operation shaft 22 is inserted in the recess 31, the upper end portion 22*a* or the side portion 22*c* of the second operation shaft 22 contacts the recess 31, and thus the upper-side portion 22*b* is locked in the recess 31. Thus, the pressing force that is applied to the switch operator 30 can be reliably transmitted to the second operation shaft 22.

The holding member 40 that holds the switch unit 10 and the operation member 20 is accommodated in an accommodating space 35 in the switch operator 30. The lower end portion 30*c* of the switch operator 30 contacts the upper surface of the pedestal 49 in the holding member 40.

Figure 7:
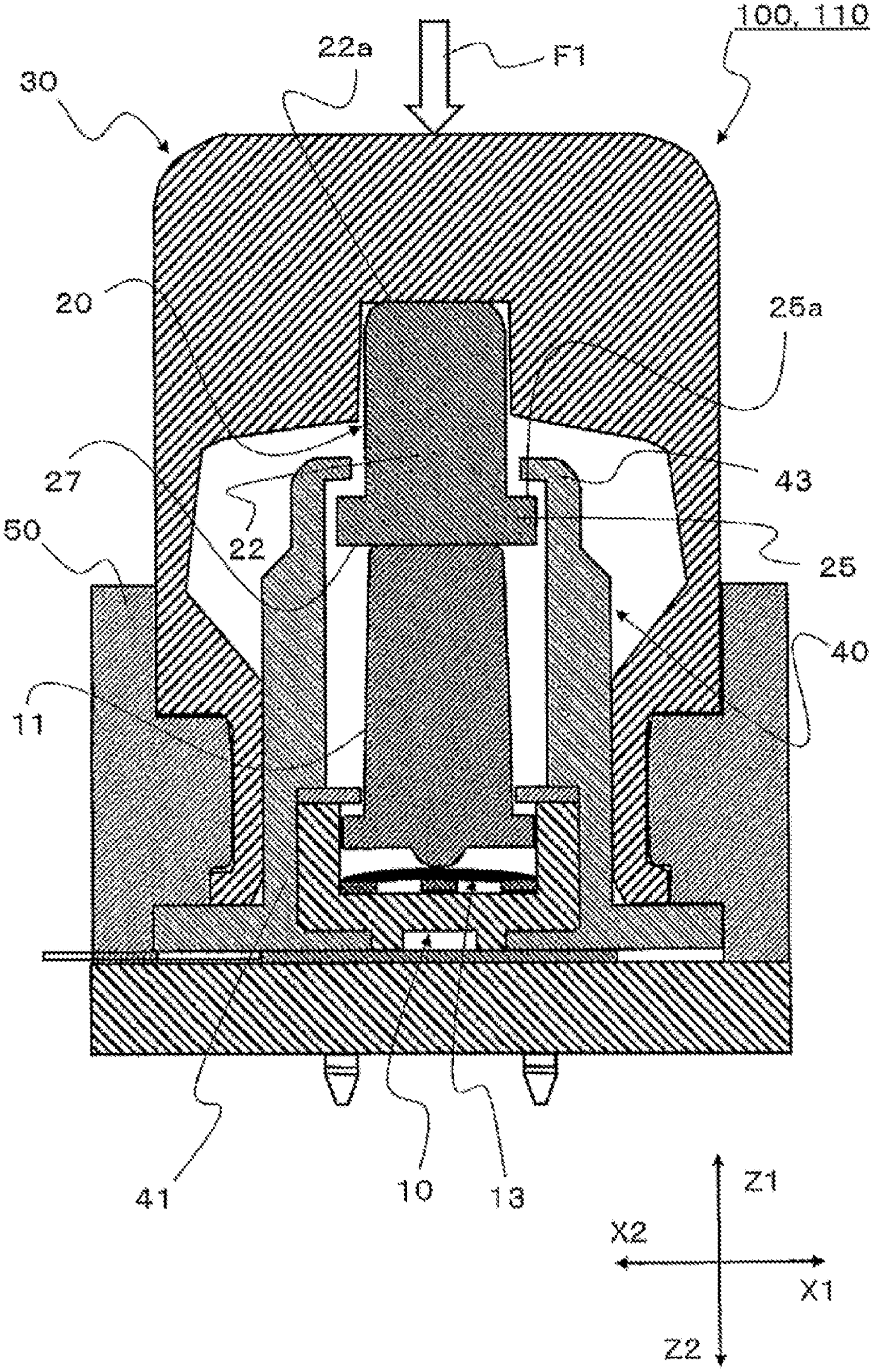
FIG. 7 is a cross-sectional view of the switching device that is operated in a vertical direction according to one embodiment.
Figure 8:
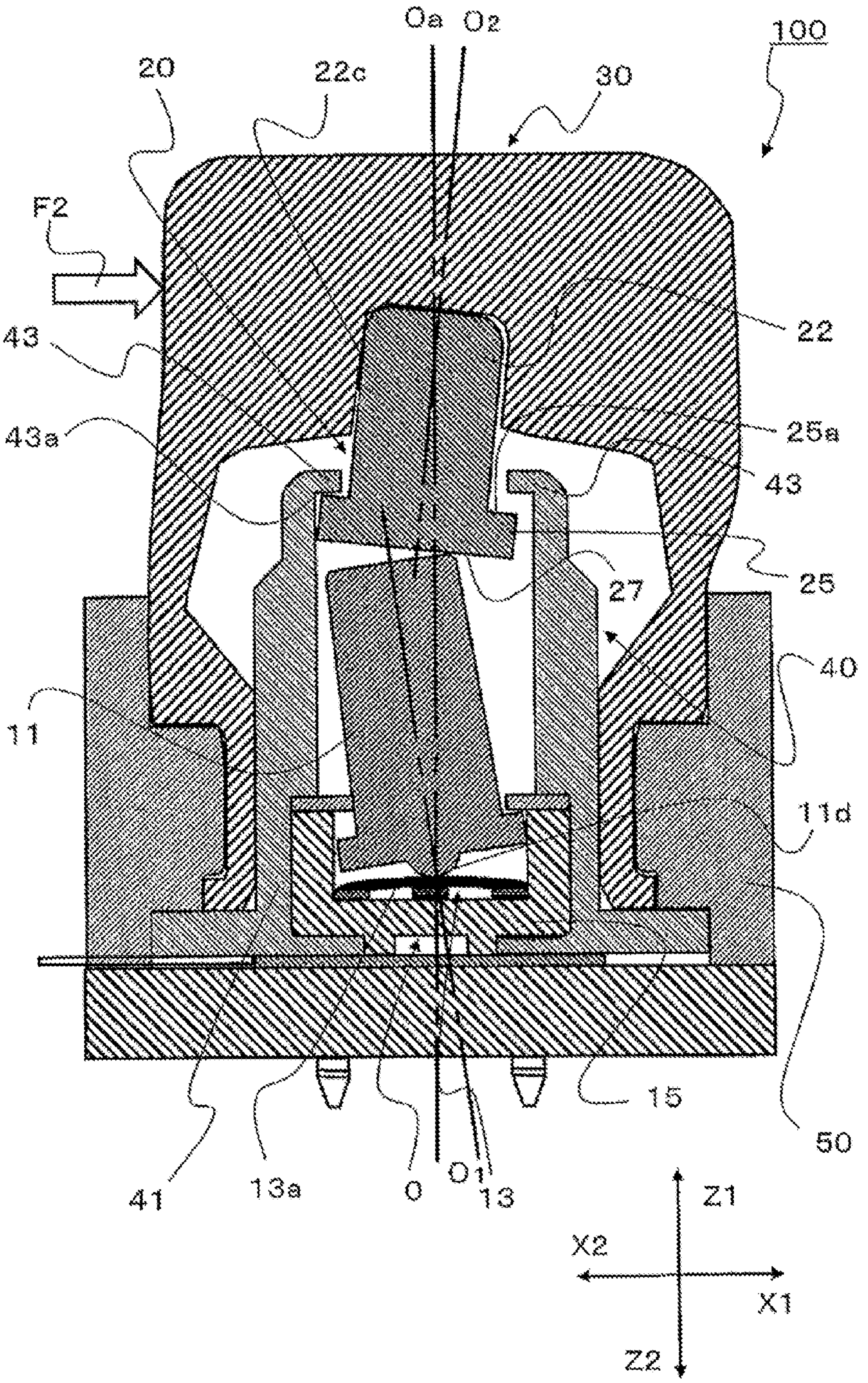
FIG. 8 is a cross-sectional view of the switching device that is operated laterally according to one embodiment.
Figure 9:
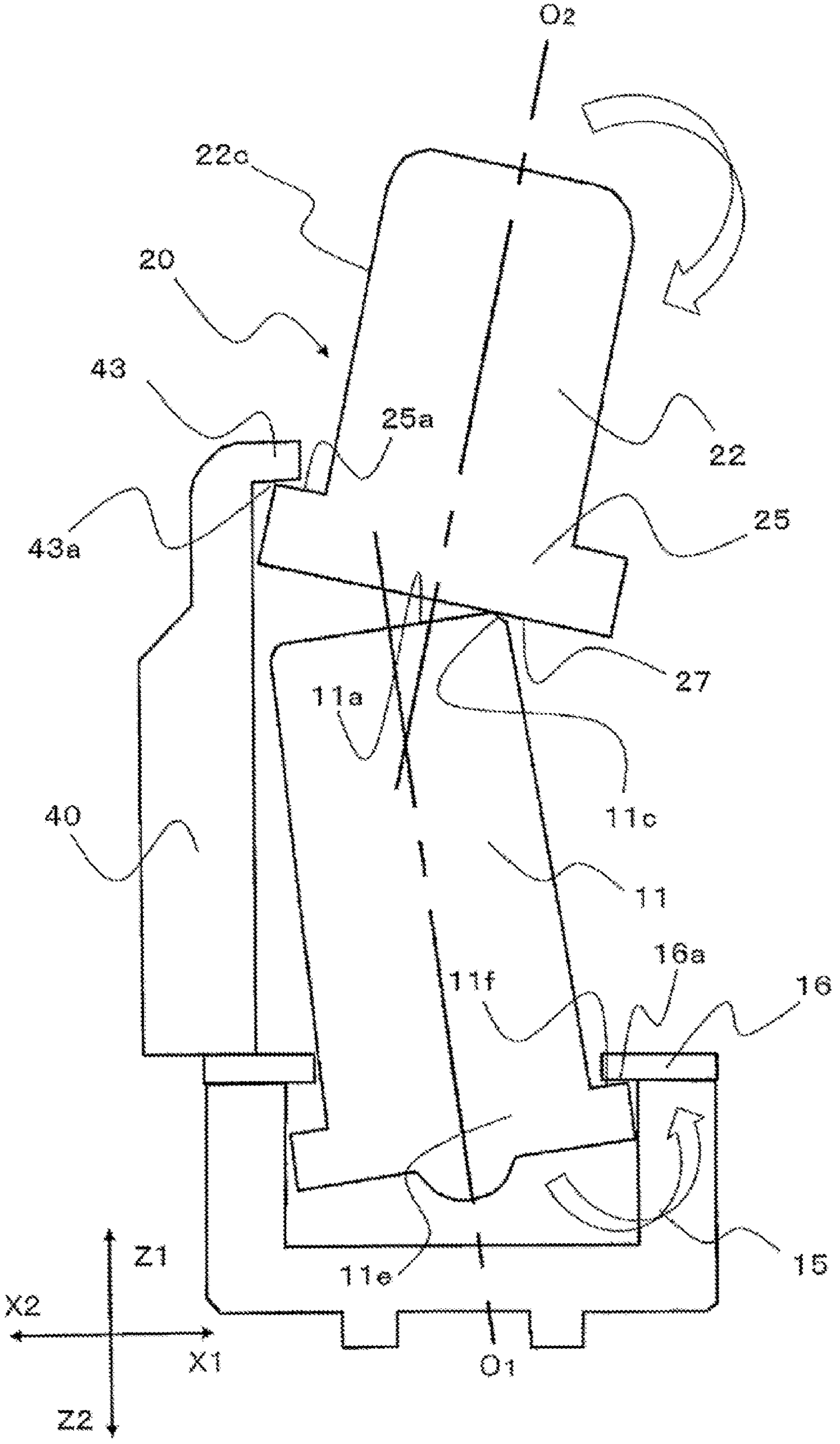
FIG. 9 is an enlarged schematic view of the switching device that is operated laterally, the enlarged schematic view being described for the relation between a first operation shaft and a second operation shaft according to one embodiment.

Hereafter, the operation of the switching device 100 will be described with reference to FIGS. 5 to 9. FIG. 7 is a cross-sectional view of the switching device 100 taken along the A-A line in FIG. 2, and the switching device 100 is operated in the vertical direction (approximately axial direction of each operation shaft). FIG. 8 is a cross-sectional view of the switching device 100 taken along the A-A line in FIG. 2, and the switching device 100 is operated laterally (tilt direction of a given operation shaft). FIG. 9 is an enlarged schematic view of the switching device 100 that is operated in laterally, the enlarged schematic view being described for the relation between the first operation shaft 11 and the second operation shaft 22.

In the initial state in which the operating force is yet to act on the switch operator 30, axial lines of the first operation shaft 11 and the second operation shaft 22 coincide with a center line Oa. Thus, each of the first operation shaft 11 and the second operation shaft 22 is moved in a Z1-direction through an elastic restoring force that acts on the movable contact 13*a*, to thereby be held in a stable state.

As illustrated in FIG. 7, in the switching device 100, when a pressing force F1 is applied to the switch operator 30 in the vertical direction from the upper side to the lower side of the switching device 100, the upper end portion 22*a* of the second operation shaft 22 is pressed, and thus the operation member 20 moves downward. In contrast, when the first operation shaft 11 of the switch unit 10 is pressed downward through a portion 27 of the operation member 20, the contact structure 13 becomes in an operational state so that given contacts become electrically conductive.

When the pressing force F1 is applied to the switch operator 30 in the vertical direction from the upper side to the lower side, the contact-pressing portion 11*d* of the first operation shaft 11 illustrated in FIG. 5 presses the movable contact 13*a*, in the contact structure 13 within the switch unit 10. The pressed movable contact 13*a* moves and becomes in contact with each of the first fixed contact 13*b*, the second fixed contact 13*c*, and the second fixed contact 13*d*. As a result, the first fixed contact 13*b* is in electrical continuity with each of the second fixed contact 13*c* and the second fixed contact 13*d*, and thus the switching device 100 becomes in a conductive state.

In this case, as illustrated in FIG. 7, the upper surface 25*a* of the second flange 25 in the operation member 20 is separated from the engagement portion 43 of the holding member 40, and thus becomes in a state in which the operation member 20 is not engaged with the engagement portion 43. In this case, the first operation shaft 11 and the second operation shaft 22 in the switch unit 10 are supported by pressure that is applied vertically.

In the switching device 100, as illustrated in FIG. 8, when a lateral pressing force F2 is applied to the switch operator 30, the pressing pressure F2 is transmitted to the first operation shaft 11 of the switch unit 10 through the second operation shaft 22, and thus the first operation shaft 11 tilts. Therefore, the contact structure 13 is electrically conductive.

In detail, when the lateral pressing force F2 is applied to the switch operator 30, e.g., when the pressing force F2 is applied in the X1-direction, the upper-side portion 22*b* of the second operation shaft 22, i.e., the side portion 22*c* of the operated portion, is pressed as illustrated in FIG. 9, and thus an axial line O2 of the second operation shaft 22 tilts in a right direction. When the second operation shaft 22 tilts rightward, (i) an edge of the upper surface 25*a* of the second flange 25 in the second operation shaft 22 and (ii) the engagement portion (second fixed-side support) 43 of the holding member 40 serve as a second contact portion 43*a*. Rotating (tilt operation of an axial line O2) of the second operation shaft 22 in a clockwise direction is performed about a support that is served by the second contact portion 43*a*.

Before the second operation shaft 22 tilts rightward, as illustrated in FIG. 6, a majority of the contact portion 27 in the second operation shaft 22 contacts the top surface 11*a* in the first operation shaft 11. In contrast, when the second operation shaft 22 tilts rightward, a point of the contact between the contact portion 27 in the second operation shaft 22 and the first operation shaft 11 moves rightward, and thus the contact portion 27 comes into contact with the edge 11*c* of the first operation shaft 11, as illustrated in FIGS. 8 and 9.

In a state in which the contact portion 27 and the edge 11*c* contact each other, when the lateral pressing force F2 is further applied to the switch operator 30, the contact portion 27 laterally pushes the edge 11*c* of the first operation shaft 11, and thus the first operation shaft 11 rotates such that the axial line O1 is inclined leftward. When the first operation shaft 11 rotates in an anticlockwise direction, a contact, as a contact portion, between the contact-pressing portion 11*d* and the movable contact 13*a* first serves as a support, and thus the tilt operation of the first operation shaft 11 is performed with the support. When the first operation shaft 11 further tilts, a contact, as the contact portion 16, between (i) an edge of the right-side (X1-side) upper surface 11*f* (see FIG. 9) of the first flange 11*e* in the first operation shaft 11 and (ii) the lower surface of the upper housing 16 on the switch body 15 serves as the first contact portion 16*a*, and thus the tilt operation of the first operation shaft 11 is performed with a support that is served by the contact portion 16*a*. With this arrangement, when the tilt operation of the first operation shaft 11 is performed, the location of a given support is changed from the location of a given contact portion to the location of the first contact portion.

The first operation shaft 11 tilts with only a given contact portion that serves as a support, where the given contact portion is a contact between the contact-pressing portion 11*d* and a movable contact 13*a*. However, then, the upper flange surface 11*f* and the upper housing 16 may not come into contact with each other, due to an operation manner or dimensions of each member.

When the tilt operation of the first operation shaft 11 is performed in accordance with the rotation of the second operation shaft 22, the contact-pressing portion 11*d* deforms the movable contact 13*a* in a state in which the first operation shaft 11 tilts left as illustrated in FIG. 8, and thus the contact structure 13 becomes electrically conductive. Operation relating to electrical continuity achieved within the contact structure 13 is performed as in a case in which the vertical pressing force F1 is applied to the switch operator 30 described above.

Instead of the case in which the pressing force F2 is applied to the switch operator 30 in the X1-direction, i.e., a horizontal direction, when the pressing force F2 is applied, for example, from a left diagonal direction, the operation of the switching device 100 may be performed as in a case in which the pressing force F2 is applied in the X1-direction described above. As a switch unit having a structure in which pressing is performed laterally, a structure in which pressing is performed laterally may be used, instead of the above-described structure.

As described above, when the switch operator 30 is pressed laterally, the second operation shaft 22 rotates about a support that is served by a contact, as the second contact portion 43*a*, between the second flange 25 of the operation member 20 and the engagement portion 43 of the holding member 40. In such a case, in the first operation shaft 11, a contact between the contact-pressing portion 11*d* and the movable contact 13*a* is first served by the second contact portion 43*a*, and then a first contact portion 16*a* between the first flange 11*e* and the lower surface of the upper housing 16 serves as a support. In such a manner, the first operation shaft 11 rotates in an anticlockwise direction and thus the contact structure 13 within the switch unit 10 becomes conductive. With this arrangement, the switching device 100 can be operated through a small lateral operational stroke and an appropriate pressing force.

Further, an operational stroke to be made when the switch operator 30 is pressed laterally, and a length from the lower end of the first operation shaft 11 to the upper end of the second operation shaft 22 can be each easily adjusted depending on (i) the length of each of the first operation shaft 11 and the second operation shaft 22 or (ii) the position of the engagement portion 43. Thus, the lateral operational stroke and the height of the switch operator 30 can be individually adjusted. As a result, better operability can be secured by optimizing each of the lateral operational stroke and the height of the switch operator 30.

[First Modification of the Embodiment]

Figure 10:
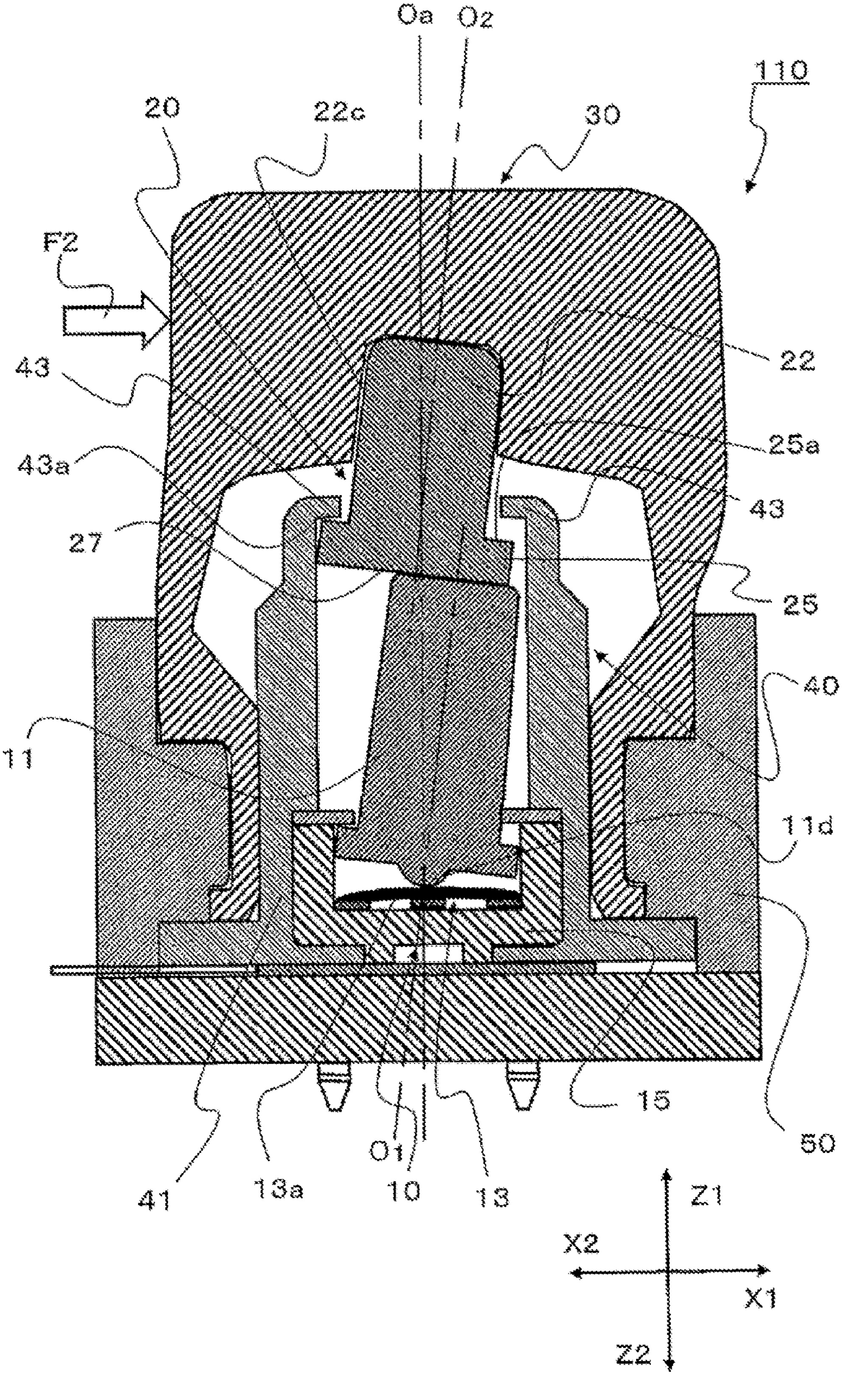
FIG. 10 is a cross-sectional view of the switching device that is operated in the lateral direction according to a first modification.
Figure 11:
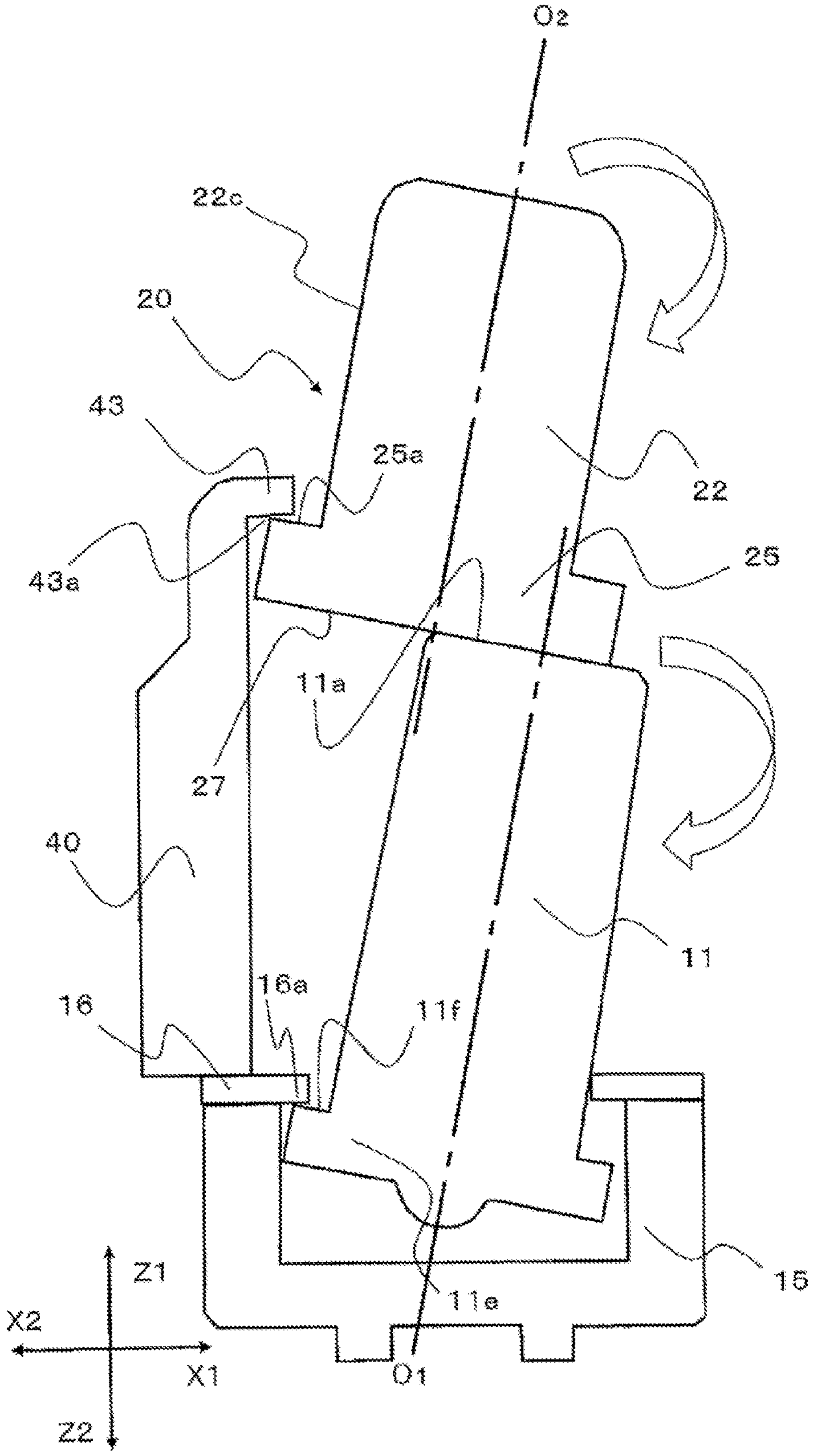
FIG. 11 is an enlarged schematic view of the switching device that is operated laterally according to the first modification, the enlarged schematic view being described for the relation between the first operation shaft and the second operation shaft.

Hereafter, the configuration of a switching device 110 according to a first modification of the embodiment will be described with reference to FIGS. 6, 7, 10, and 11. FIG. 10 is a cross-sectional view of the switching device 110 that is operated laterally. FIG. 11 is an enlarged schematic view of the switching device 110 that is operated laterally, and the enlarged schematic view being described for the relation between the first operation shaft 11 and the second operation shaft 22.

As illustrated in FIG. 6, the configuration of the switching device 110 and the configuration of the switching device 100 are basically the same. The description for the configuration of the switching device 110 is omitted. The numerals are respectively used to denote components that are the same as those of the switching device 100.

As in the switching device 100, in the switching device 110, when the pressing force F1 is applied to the switch operator 30 in the vertical direction from the upper side to the lower side, as illustrated in FIG. 7, the upper end portion 22*a* of the second operation shaft 22 is pressed, and thus the operation member 20 moves downward. Then, the first operation shaft 11 of the switch unit 10 is pressed downward through the contact portion 27 of the operation member 20.

Thus, the contact structure 13 becomes electrically conductive. In this case, the contact structure 13 is operated as in the case of the switching device 100, and accordingly, the description for the operation of the contact structure 13 is omitted.

Next, in the switching device 110, as illustrated in FIG. 10, when the lateral pressing force F2 is applied to the switch operator 30, the pressing force F2 is transmitted to the first operation shaft 11 of the switch unit 10 through the second operation shaft 22, and thus the first operation shaft 11 is pressed. With this arrangement, the contact structure 13 becomes electrically conductive.

In detail, when the lateral pressing force F2 is applied to the switch operator 30, for example, when the pressing force F2 is applied in the X1-direction, the side surface 22*c* of the upper portion 22*a*, which is a portion to be operated, of the upper portion 22*a* is pressed as illustrated in FIG. 11, and thus the second operation shaft 22 tilts right. When the second operation shaft 22 tilts right, the second contact portion 43*a* between (i) an edge of the upper surface 25*a* of the second flange 25 in the second operation shaft 22 and (ii) the second contact portion 43*a* of the engagement portion 43 in the holding member 40 serve as a support, and the axial line O2 of the second operation shaft 22 is inclined right.

Prior to the rotation of the second operation shaft 22 in a clockwise direction, as illustrated in FIG. 6, a majority of the contact portion 27 in the second operation shaft 22 contacts the upper surface 11*a* of the first operation shaft 11. However, when the second operation shaft 22 rotates in the clockwise direction, as illustrated in FIGS. 10 and 11, the point of the contact between the contact portion (couple-pressing portion) 27 of the second operation shaft 22 and the top surface (portion to be pressed) 11*a* of the first operation shaft 11 moves to the right side of the contact portion 27, and thus a right-side (X1-side) portion area of the contact portion 27, which is about half the entire area of the contact portion 27, contacts the upper surface 11*a* of the first operation shaft 11.

Unlike the switching device 100 illustrated in FIG. 8, in FIG. 10 and FIG. 11, the contact portion 27 of the second operation shaft 22 and the upper surface 11*a* of the first operation shaft 11 contact each other. In the switching device 100 illustrated in FIG. 8, when the second operation shaft 22 rotates in the clockwise direction, the majority of the upper surface 11*a* of the first operation shaft 11 is separated from the contact portion 27 of the second operation shaft 22, and thus only the edge 11*c* contacts the contact portion 27. In contrast, in the switching device 110 illustrated in FIG. 10 and FIG. 11, the contact portion 27 of the second operation shaft 22 and the upper surface 11*a* of the first operation shaft 11 are likely to closely contact each other, and thus the upper surface 11*a* of the first operation shaft 11 is difficult to be separated from the contact portion 27 of the second operation shaft 22 when the second operation shaft 22 rotates in the clockwise direction. With this arrangement, in a state in which the upper surface 11*a* of the first operation shaft 11 is translated rightward, the first operation shaft 11 is configured such that the axial line O1 moves in a direction corresponding to the tilt of axial line O2 of the second operation shaft 22.

The difference in operation between the switching device 100 illustrated in FIG. 8 and the switching device 110 illustrated in FIG. 10 depends mainly on the size of the upper surface 11*a* of the first operation shaft 11. When the area of the upper surface 11*a* of the switching device 100, as illustrated in FIG. 8, is greatly smaller than the area of the upper surface 11*a* as illustrated in FIG. 10, the above-mentioned operation difference occurs. Also, the difference in a frictional force between the contact portion 27 of the second operation shaft 22 and the upper surface 11*a* of the first operation shaft 11 results in the operation difference between the switching devices. In order to perform the operation of the switching device 110, a friction coefficient obtained between the contact portion 27 in the second operation shaft 22 and the upper surface 11*a* of the first operation shaft 11 in the switching device 110 of the button type is set to a value that is sufficient to enable appropriate adhesion between the contact portion 27 and the upper surface 11*a* of the first operation shaft 11. In contrast, in the switching device 100, the friction coefficient between the contact portion 27 of the second operation shaft 22 and the upper surface 11*a* of the first operation shaft 11 is set to a value that is sufficient to avoid causing the contact portion 27 and the upper surface 11*a* in the first operation shaft 11 to come into close contact with each other.

In a state in which the contact portion 27 of the second operation shaft 22 and the upper surface 11*a* of the first operation shaft 11 are in contact with each other, when the lateral pressing force F2 is further applied to the switch operator 30, the first operation shaft 11 and the second operation shaft 22 is inclined together right. When the first operation shaft 11 tilts right, a contact portion between the contact-pressing portion 11*d* and the movable contact 13*a* first serves as a support, and thus the tilt operation of the first operation shaft 11 is performed with the support as the contact portion. Subsequently, a contact between (i) an edge of the left-side (X2-side) upper flange surface 11*f* (see FIG. 11) of the first flange 11*e* in the first operation shaft 11 and (ii) the lower surface of the upper housing 16 on the switch body 15 serves as the first contact portion 16*a*, and thus the axial line O1 of the first operation shaft 11 is inclined right.

When the first operation shaft 11 rotates in a clockwise direction, as illustrated in FIG. 10, the contact-pressing portion 11*d* deforms the movable contact 13*a*, and thus the contact structure 13 becomes electrically conductive. The contact structure 13 is operated to become electrically conductive, as in a case in which the vertical pressing force F1 is applied to the switch operator 30 described above.

[Second Modification of Embodiment]

Figure 12:
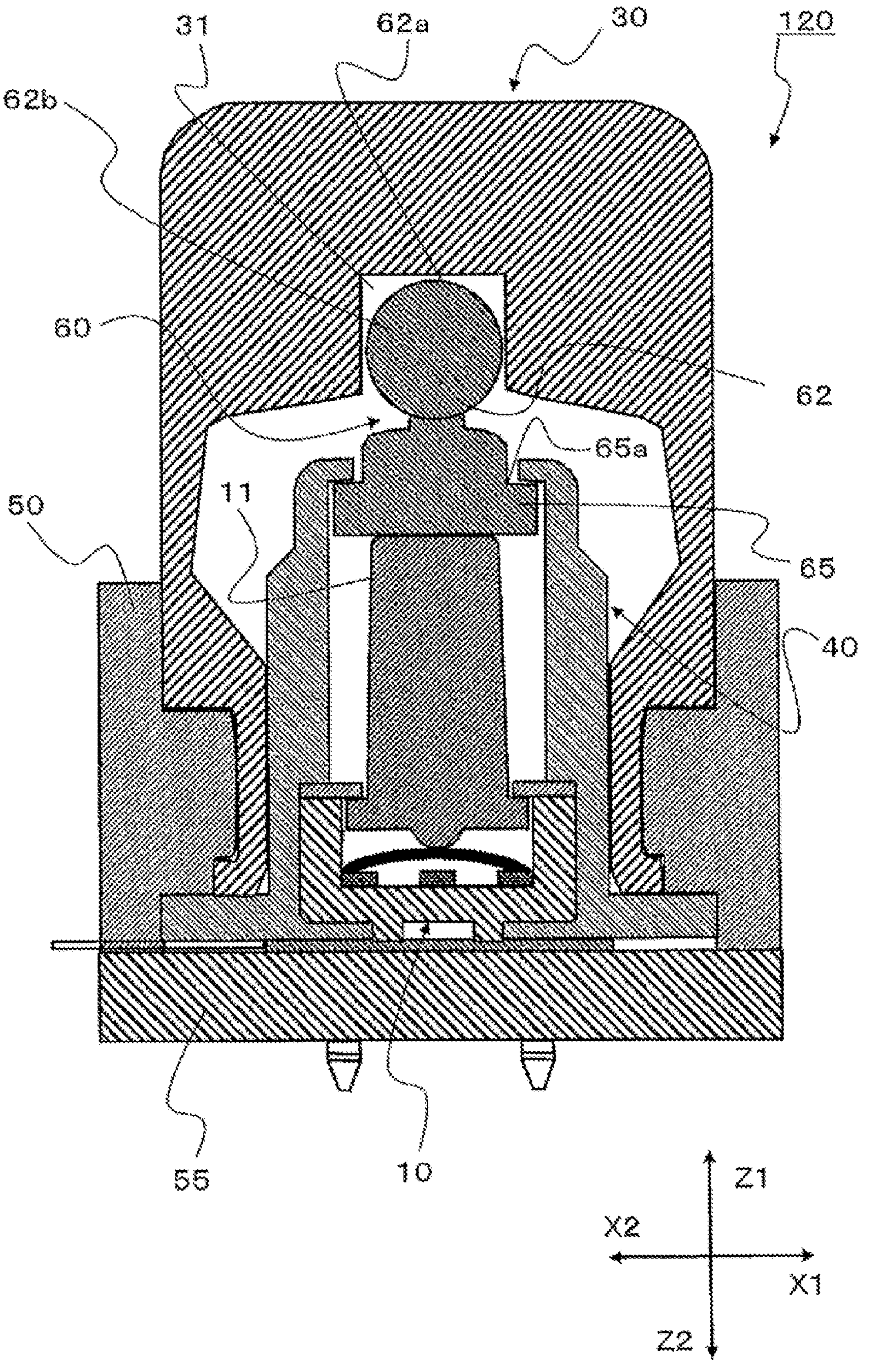
FIG. 12 is a cross-sectional view of the switching device according to a second modification.

Hereafter, the configuration of a switching device 120 will be described with reference to FIG. 12. The switching device 120 is described in a second modification to the switching device 100 described above. FIG. 12 is a cross-sectional view of the switching device 120 taken along the A-A line in FIG. 2.

The configuration of the switching device 120 illustrated in FIG. 12 differs from the configuration of the switching device 100 illustrated in FIG. 8, in only the shape of the operation member 60. Accordingly, the description for components other than the operation member 60 is omitted. The numerals that denote the same components as those of the switching device 100 are used to denote corresponding components of the switching device 120, other than the operation member 60. A perspective view of the switching device 120, when viewed from above, is illustrated as in the perspective view of the switching device 100 illustrated in FIG. 2.

As illustrated in FIG. 12, the switching device 120 includes the base 55, the case 50, the switch unit 10, the holding member 40, the operation member 60, and the switch operator 30.

The operation member 60 includes the first operation shaft 11 and a second operation shaft 62. The second operation shaft 62 is aligned with the first operation shaft 11, in an axial direction, so as to contact the first operation shaft 11. A first flange 65 that is formed to have a circular shape in a plan view, and an upper surface 65*a* of the first flange 65 is formed on a lower portion of the second operation shaft 62.

In the switching device 120, an upper-side portion 62*b* of the second operation shaft 62 has a spherical shape. The inner surface of the recess 31 in the switch operator 30 has a rectangular shape, as in the recess 31 in the switching device 100.

In a state in which the press operation of the switch operator 30 is yet to be performed, a ceiling portion of the recess 31 in the switch operator 30, and a top end portion 62*a* of the second operation shaft 62 do not contact each other, and further, a wall of the recess 31, and a lateral-side end of the upper-side portion 62*b* in the second operation shaft 62 do not contact each other. In this case, a small space between the ceiling portion and the top end portion 62*a*, as well as a small space between the wall of the recess 31 and the lateral-side portion of the upper-side portion 62*b*, are provided.

When the press operation of the switch operator 30 is performed in a state in which the upper-side portion 62*b* in the second operation shaft 62 is inserted in the recess 31, the top end portion 62*a* or the upper-side portion 62*b* of the second operation shaft 62 contacts the recess 31, and thus is locked in the recess 31. Thus, the pressing force applied to the switch operator 30 can be reliably transmitted to the second operation shaft 62.

The shape of the upper-side portion 62*b* in the second operation shaft 62 is spherical. In this case, even when the switch operator 30 is operated in any one of the vertical direction and the lateral direction, and the resulting pressed point of the switch operator 30 is slightly displaced, the point of the contact between the second operation shaft 62 and the first operation shaft 11 is not greatly displaced. With this arrangement, a good control feel can be obtained in comparison to a case in which the shape of the upper-side portion 62*b* in the second operation shaft 62 is cylindrical.

[Third Modification of Embodiment]

Figure 13:
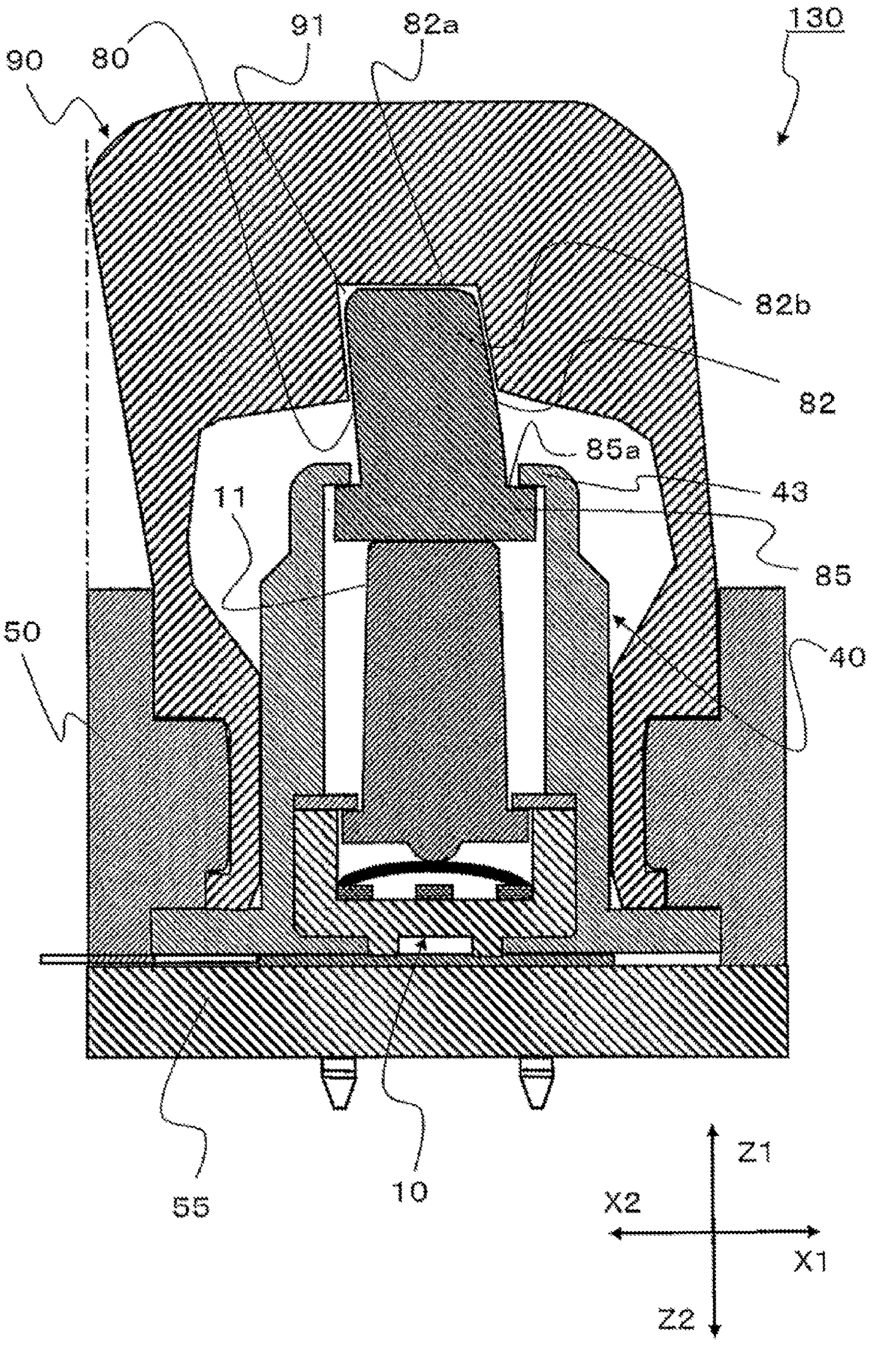
FIG. 13 is a cross-sectional view of the switching device according to a third modification.
Figure 14:
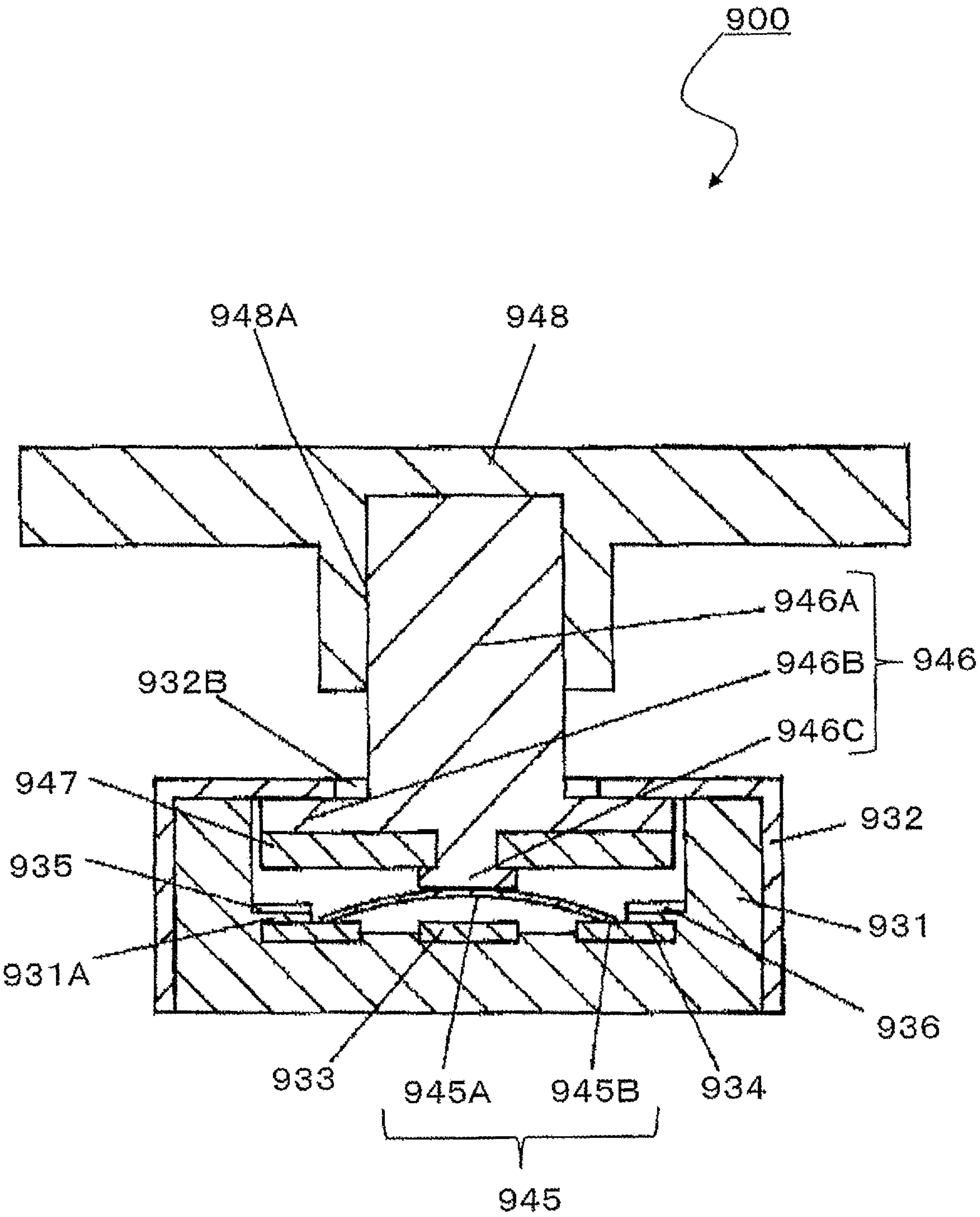
FIG.14 PRIOR ART
FIG. 14 is a cross-sectional view of a multidirectional operation switch in related art.

Hereafter, the configuration of a switching device 130 will be described with reference to FIG. 13. The switching device 130 illustrated in FIG. 13 is described in a third modification of the switching device 100 described above. FIG. 13 is a cross-sectional view of the switching device 130 taken along the A-A line in FIG. 2.

The configuration of the switching device 130 illustrated in FIG. 13 only differs from the configuration of the switching device 100 illustrated in FIG. 6, in the shape of a second operation shaft 82, which constitutes part of an operation member 80, and in the shape of a switch operator 90. Accordingly, the description for components other than the operation member 80 and the switch operator 90 is omitted. The numerals that denote the same components as those of the switching device 100 are used to denote corresponding components of the switching device 130, other than the operation member 80 and the switch operator 90.

As illustrated in FIG. 13, the switching device 130 includes the base 55, the case 50, the switch unit 10, the holding member 40, the operation member 80, and the switch operator 90.

The operation member 80 includes the first operation shaft 11 and a second operation shaft 82. A first flange 85 that is formed to have a circular shape in a plan view, and an upper surface 85*a* of the first flange 85 are formed in a lower-side portion of the second operation shaft 82.

The second operation shaft 82 of the switching device 130 is provided to tilt with respect to the first operation shaft 11. That is, the axial line of the first operation shaft 11 and the axial line of the second operation shaft 82 are not parallel to each other. In the present embodiment, the second operation shaft 82 is provided to tilt toward the left-side (on the X2-side) with respect to the first operation shaft 11. That is, the central axis of the second operation shaft 82 is inclined with respect to the holding member 40. Also, the shape of the inner surface of the recess 91 in the switch operator 90 is formed so as to be inclined left in order to correspond to the second operation shaft 82.

Further, the contour of the switch operator 90 is provided to be inclined left in order to correspond to the second operation shaft 82. The left-side corner of the switch operator 90 is provided so as to match the left side of the case 50.

In a state in which the press operation of the switch operator 90 is yet to be performed, in the switch operator 90, the ceiling portion of the recess 91 in the switch operator 90 does not contact a top end portion 82*a* in the second operation shaft 82, and the wall of the recess 91 does not contact the side surface of an upper-side portion 82*b* in the second operation shaft 82. In this case, a small space is provided between the ceiling portion of the recess 91 and the top end portion 82*a*, as well as a small space between the wall of the recess 91 and the side surface of the upper-side portion 82*b*, are provided.

When the press operation of the switch operator 90 is performed in a state in which the upper-side portion 82*b* of the second operation shaft 82 is inserted in the recess 91, the top end portion 82*a* of the second operation shaft 82 or a given side surface of the upper-side portion 82*b* in the second operation shaft 82 contacts the recess 91 to thereby be locked in the recess 91. With this arrangement, the operation force applied to the switch operator 90 can be reliably transferred to the second operation shaft 82.

Also, the central axis of the second operation shaft 82 is inclined with respect to the holding member 40, and thus the switch operator 90 can easily be located at any corner of a device into which the switching device 130 is incorporated.

The effects obtained in one or more embodiments of the present disclosure will be described below.

In the switching device 100 in the present disclosure, when the switch operator 30 is pressed laterally, the second operation shaft 22 rotates about a support that is served by the second contact portion 43*a*, at which the second flange 25 is engaged with the engagement portion 43 of the holding member 40, and thus the first operation shaft 11 rotates in accordance with the rotation of the second operation shaft 22. With this arrangement, the lateral pressing force F2 applied to the switch operator 30 can be efficiently converted into a pressing pressure through which the contact structure 13 is electrically conductive. Thus, operations can be performed through a reduced lateral operational stroke and appropriate pressing force. As a result, operability can be improved.

Also, when the lateral pressing force F2 is applied to the switch operator 30, the contact portion 27 of the operation member 20 contacts the edge 11*c*, and thus the first operation shaft 11 is configured to be laterally pushed. With this arrangement, operations can be performed through a more appropriate pressing pressure. Further, the operational stroke that is made when the switch operator 30 is laterally pressed, as well as the length from the lower end of the first operation shaft 11 to the upper end of the second operation shaft 22, can be each easily adjusted based on at least one of (i) the length of each of the first operation shaft 11 and the second operation shaft 22 and (ii) the position of the engagement portion 43. Thus, the lateral operational stroke and the height of the switch operator 30 can be individually adjusted. As a result, better operability can be ensured by optimizing each of the operation shaft length and the position of the engagement portion 43.

Further, in the switching device 110 according to the first modification of the present disclosure, when the lateral pressing force F2 is applied to the switch operator 30, a given surface of the contact portion 27 of the operation member 20 contacts the top surface 11*a* of the first operation shaft 11, and thus the contact area between the operation member 20 and the first operation shaft 11 can be increased. With this arrangement, operations can be more reliably performed through an appropriate pressing force.

In the switching device 120 according to the second modification of the present disclosure, the shape of the upper-side portion 62*b* in the second operation shaft 62 is spherical. With this arrangement, even when the switch operator 30 is operated in any one of the vertical direction and lateral direction, and the resulting pressed point of the switch operator 30 is slightly displaced, the contact point of the second operation shaft 62 with the first operation shaft 11 is not significantly displaced. Therefore, a good control feel can be obtained in comparison to a case in which the shape of the upper-side portion 62*b* in the second operation shaft 62 is cylindrical.

In the switching device 130 according to the third modification of the present disclosure, when the central axis of the second operation shaft 82 is inclined with respect to the holding member 40, the switch operator 90 can be easily disposed at a given corner of a device into which the switching device 130 is incorporated.

As described above, in each switching device according to the present disclosure, when the switch operator is pressed laterally, a second contact portion is formed between a second flange in a second operation shaft and an engagement portion in a holding member, and thus the second contact portion serves as a support about which a second operation shaft rotates. With this arrangement, a first operation shaft rotates in accordance with the rotation of the second operation shaft. Thus, the lateral pressing pressure applied to the switch operator can be efficiently converted into a pressing pressure through which a contact structure is electrically conductive. Therefore, operations can be performed based on a smaller lateral operational stroke and appropriate pressing force. As a result, operability can be improved.

The present disclosure is not limited to the embodiments described above, and various modifications can be made without departing from the scope of the present disclosure. For example, a given operation shaft to be inclined may include three or more shafts among first operation shafts 11 and second operation shafts 22, where a third operation shaft is aligned with the first operation shaft and second operation shaft so as to be disposed on the second operation shaft, for example.

What is claimed is:

1. A switching device comprising:

a switch body including a contact structure, the contact structure including
- multiple fixed contacts, and
- a movable contact having an upwardly protruded dome shape and formed of a resilient conductive metal;

an upper housing provided above the switch body and having a lower surface and a first hole;

an operation member including at least a first operation shaft and a second operation shaft, the first operation shaft configured to operate the contact structure and including a first flange, the first flange including
- a contact-pressing portion in contact with the movable contact, the contact-pressing portion protruded downward and having a hemispherical shape, and
- an upper surface in contact with the lower surface of the upper housing, and the second operation shaft including a lower end and configured to receive an operation force;

a second flange provided at the lower end of the second operation shaft, the second flange having a diameter that is greater than a diameter of the second operation shaft; and a holding member within which the switch body is held, the holding member including
- a cylindrical holding portion, and
- a cylindrical engagement portion that protrudes upward from the cylindrical holding portion, the cylindrical engagement portion having a second hole, and the second hole having a diameter that is less than a diameter of each of the cylindrical holding portion and the second flange, wherein a diameter of the first hole is greater than a diameter of the first operation shaft, and is less than a diameter of the first flange, wherein the diameter of the second hole is greater than the diameter of the second operation shaft, and wherein an upper end of the first operation shaft contacts the lower end of the second operation shaft without fixing the first operation shaft and the second operation shaft.

* * * * *